United States Patent [19]

Brandstatter

[11] 4,256,496

[45] Mar. 17, 1981

[54] PRODUCTION OF METAL CARBIDES IN PURE FORM

[75] Inventor: Hans G. Brandstatter, Welland, Canada

[73] Assignee: Ontario Research Foundation, Mississauqa, Canada

[21] Appl. No.: 959,201

[22] Filed: Nov. 9, 1978

Related U.S. Application Data

[63] Continuation-in-part of Ser. No. 861,507, Dec. 16, 1977, abandoned, which is a continuation of Ser. No. 494,927, Aug. 5, 1974, abandoned.

[51] Int. Cl.$^3$ .............................................. C04B 35/52
[52] U.S. Cl. ......................................... 106/43; 423/2; 423/49; 423/53; 423/62; 423/69; 423/138
[58] Field of Search .......................... 75/80, 84, 130.5; 423/53, 62, 49, 2, 439, 69, 440, 138; 106/43

[56] References Cited

U.S. PATENT DOCUMENTS

| | | | |
|---|---|---|---|
| 2,137,144 | 11/1938 | Sainderichin | 423/440 |
| 2,553,444 | 5/1951 | Dunn et al. | 423/53 |
| 3,502,461 | 3/1970 | Guttler et al. | 75/40 |
| 3,844,765 | 10/1974 | Baum | 75/80 |

*Primary Examiner*—Melvyn J. Andrews
*Attorney, Agent, or Firm*—Sim & McBurney

[57] ABSTRACT

Metals in oxide, carbonate and/or hydroxide form in ores or ore concentrates are converted to the corresponding carbide by a solid state reaction with carbon. The carbide then is separated in substantially pure form from the gangue constituents and may be converted to the metal.

7 Claims, No Drawings

PRODUCTION OF METAL CARBIDES IN PURE FORM

REFERENCE TO RELATED APPLICATION

This application is a continuation-in-part of Ser. No. 861,507 filed Dec. 16, 1977 now abandoned, which in turn is a continuation of Ser. No. 494,972 filed Aug. 5, 1974 (now abandoned).

FIELD OF INVENTION

This invention relates to the recovery of metal values from ores or concentrates thereof in carbide form.

BACKGROUND TO THE INVENTION

The metal values in ores usually are present in oxide, carbonate and/or hydroxide form in intimate admixture with gangue constituents which also are metal oxides. "Gangue" is considered to be the minerals and rock material mixed with the metallic ore which are themselves valueless. The precise chemical form of the gangue constituents depends on the ore but usually includes silica, alumina, magnesia and lime.

Since the initial ore or concentrate thereof contains an intimate mixture of metals in oxide, carbonate and/or hydroxide forms of very similar properties, the desired metal for which the ore was originally mined cannot readily be separated in its oxide, carbonate, and/or hydroxide form from the gangue material.

The recovery of metals from their ores generally has involved a smelting procedure using coke and a flux. The liquid metal is tapped at intervals from the smelter, followed by solidification, cleaning and sizing of the metal or alloy. The process is polluting in nature, difficult to control, is subject to heavy product losses in slag, hence requiring recycling, and impure products often are formed.

SUMMARY OF THE INVENTION

The present invention does not employ such smelting procedures but rather converts the desired metal to a carbide form by a solid state reduction and carburization reaction. Gangue oxides associated with metal values which can be converted to the carbide form generally resist such carburization. The result is a mixture of metal carbide of the metal desired to be recovered and unaffected gangue oxides.

At temperatures above about 1500° C., silica converts to silicon carbide and above about 1700° C. to volatile SiO. Alumina and lime form their respective carbides at temperatures above about 1800° C.

Metal carbides generally exhibit distinctly different physical properties from the various gangue oxide constituents of ores and hence simple physical separation, i.e. standard beneficiation methods, are used to recover the metal carbides in substantially pure form. Such physical separation may be effected using gravity, flotation, magnetic and electrostatic treatments.

One such physical separation technique involves the use of gravity separation employing water elutriation. A preferred procedure for separating the metal carbide by this procedure involves crushing and grinding the product obtained by the solid state carburization step to size, about −200 mesh, with the bulk of the carbide particles having a particle size greater than 20 microns. The hydroelutriation then is effected to permit settling and separation of the heavier metal carbide particles from the lighter gangue particles dispersed and removed with the overflow. The carbide fraction may be reground to a finer size and the hydroelutriation repeated for further purification.

By using the process of the present invention, substantially all the metal values which are desired to be recovered from the ore or concentrate and cannot be separated directly by simple separation from the other ore or concentrate gangue constituents are converted by a non-polluting solid state reduction and carburization reaction to the corresponding carbide, in accordance with the schematic equation:

$$MeO + 2C \rightarrow MeC + CO$$

The differences in physical properties of the metal carbide and the gangue oxides permit ready separation of the metal carbide in substantially pure form from the gangue oxides.

GENERAL DESCRIPTION OF INVENTION

There are prior art procedures which attempt to use solid state reduction and carburization on ores but this step is usually used in conjunction with a further processing step to obtain metal product, usually involving melting and/or smelting.

Reference is had to U.S. Pat. No. 3,502,461 to Guttler et al issued Mar. 24, 1970 wherein there is described the production of metals from ores by a two-stage procedure in which, in the first stage a partial reduction of metal oxides is effected in the solid state with carbon to form metal and/or metal carbide, followed by a final reduction of the remaining metal oxides using a smelting process.

The latter prior art procedure does not eliminate the polluting effects of a smelting process, in contrast to the present invention. It is essential to the prior art process that part only of the metal oxides be subjected to reduction, in contrast to the present invention where substantially all the metal oxide values are converted to the metal carbide.

Additionally, it does not appear to be critical to this prior art process to ensure only metal carbide formation in the solid state reduction step. Indeed, no control is discussed, the presence of some metal at the end of the first stage is indicated and, indeed, the final intended product is the metal. In contrast, in the present invention, the process is controlled so that only the metal carbide is produced and this is the product that is separated from gangue material and recovered.

This prior art contains no suggestion that the intermediate metal carbide is a desired or desirable product and there is no suggestion to effect a separation step to recover pure metal carbide from the part-reacted mixture. In the present invention, the primary intended product is a pure metal carbide prepared by direct solid state carburization of all the desired metal values and separated from the unaffected gangue material by simple physical separation procedures.

If desired, the elemental metal may be formed from the separated substantially pure metal carbide by another solid state reaction with the metal oxide in accordance with the equation:

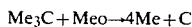
$$Me_3C + MeO \rightarrow 4Me + C$$

The conditions utilized to obtain the carbide and the elemental metal may vary widely and depend on the particular metal involved. In general, a shaft or rotary kiln may be employed and the invention may be used on both low and high grade ores.

In instances where the metal, the ore and the conditions are such that large amounts of the metal silicate and aluminate may be formed in preference to the carbide, thereby leading to only low recoveries of the metal values in the form of the carbide, it is preferred to incorporate lime into the reaction mixture in order to provide a completing reaction for the silica and alumina to form calcium silicate and calcium aluminate rather than the metal silicates and aluminates, thereby resulting in an improved yield of the metal carbide.

The invention is applicable to the formation of a large number of pure metal carbides from the corresponding ores, including those of titanium, zirconium, hafnium, vanadium, niobium, tantalum, chromium, molybdenum, uranium, tungsten, manganese and iron. Where two or more such elements are present in the ore, selective carburization may be employed to recover individual metal carbides, such as by varying the quantities of carbon used, temperature, gas composition, catalysts and time.

The present invention has particular application in the production of ferro-alloys which are used as addition agents to steel. Particular ferro-alloys which are commonly employed are high-carbon ferrochromium and high-carbon ferromanganese, usually containing about 3 to 8% C.

By the procedure of the present invention, an iron-chromium or iron-manganese ore may be carburized to provide a mixture of iron and chromium carbides or iron and manganese carbides. Following beneficiation, the carbides may be used directly as low-cost alloy addition agents to steel or may be converted to the metal. Depending on the degree of completeness of the conversion of carbide to the metal, the resulting metal alloy, either ferro-chrome or ferro-manganese, may have a low-carbon content. In the manufacture of stainless steel, the bulk of the required chromium is supplied as charge chrome having a high carbon content. Low-carbon chrome alloys are being used to adjust the final content of the steel.

Commonly employed high-carbon ferromanganese has the approximate composition 78 to 82% Mn, 7% C, 1% Si and the balance Fe, and is produced by submerged arc smelting of manganese ores. Low and medium carbon, i.e., 0.07 to 1.5% C., materials have been produced in open electric-arc furnaces by reacting manganese-silicon alloys with the ore.

The invention will be described hereinafter with particular reference to production of manganese and alloys thereof, but it will be understood that the principles described hereinafter with reference thereto also apply to the other elements mentioned above, with suitable modification for the particular element chosen.

The production of manganese carbide from the oxide in the ore in accordance with the present invention requires reaction with carbon and removal of the carbon monoxide as it is produced. The carbide is formed in accordance with the equation:

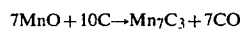
$$7MnO + 10C \rightarrow Mn_7C_3 + 7CO$$

The carbon monoxide partial pressure resulting from the reaction varies with the reaction temperature as shown in the following Table I:

TABLE I

| Temperature °C. | $P_{CO}$ (Atm.) |
|---|---|
| 830 | $1.3 \times 10^{-4}$ |
| 930 | $1.8 \times 10^{-3}$ |
| 1030 | $1.6 \times 10^{-2}$ |
| 1130 | $1.1 \times 10^{-1}$ |
| 1230 | $5.1 \times 10^{-1}$ |
| 1330 | 2.1 |

Formation of the manganese carbide proceeds if the partial pressure of carbon monoxide of the reaction exceeds the partial pressure of carbon monoxide in the atmosphere of the reaction vessel. Removal of the carbon monoxide formed is necessary to drive the reaction to completion.

At temperatures corresponding to partial pressures of carbon monoxide below 1 atmosphere, removal of carbon monoxide may be achieved by flushing the vessel with an inert gas having a partial pressure of carbon monoxide substantially below the equilibrium partial pressure, or by maintaining the vessel under vacuum. For example, at a reaction temperature of 1230° C., the equilibrium partial pressure is 0.51 atm. and the flushing gas thus should have a CO-partial pressure well below 0.1 atm.

At temperatures above about 1300° C., the equilibrium pressure is greater than 1 atm. and carbide formation proceeds rapidly in a vessel atmosphere that is inert or consists of 100% CO, provided the vessel is vented to maintain approximately atmospheric pressure therein.

Loss of manganese in the form of stable compounds such as manganese silicates and aluminates may be prevented by adding a sufficient quantity of lime to the ore as discussed above.

After separation of the carbide from the resulting gangue constituents by standard beneficiation techniques, there is obtained a manganese carbide product. Since iron oxide generally is present in manganese ores, usually the carbide product consists of a mixture of manganese carbide and iron carbide.

The recovered carbide may be used directly as a steel addition agent, or may be converted to the metal, or an alloy of metals where the recovered carbide is a mixture of metal carbides, by reaction with the metal oxide or mixture of oxides in accordance with the equation:

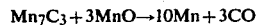
$$Mn_7C_3 + 3MnO \rightarrow 10Mn + 3CO$$

This reaction is carried out in such a manner as to remove the carbon monoxide as it is formed, typically by flushing with an inert gas, such as argon. Generally, a higher reaction temperature such as about 1100° to 1625° C., is required than that utilized for the carburization step.

Where the metal involved is chromium, different temperature conditions may be employed, based on the partial pressures of carbon monoxide, as set forth in the following Table II:

TABLE II

| Temperature °C. | $P_{CO}$ (Atm.) |
|---|---|
| 930 | 0.04 |
| 1030 | 0.26 |
| 1130 | 1.31 |
| 1230 | 5.26 |
| 1330 | 17.9 |

TABLE II-continued

| Temperature °C. | $P_{CO}$ (Atm.) |
|---|---|
| 1430 | 52.6 |

In the case of chromium carbide, there are three stable carbides, namely $Cr_3C_2$, $Cr_7C_3$ and $Cr_{23}C_6$. At lower temperatures $Cr_3C_2$ is the stable carbide, while at increasing temperatures $Cr_7C_3$ is formed at about 1200° C. and $Cr_{23}C_6$ is formed at about 1500° C.

The removal of carbon monoxide formed in the reaction may be effected following the procedures discussed above with respect to the formation of manganese carbide.

The carburization step may be carried out at a temperature of about 1025° to 1600° C. or higher and the reaction between the carbide and oxide at a temperature of about 1300° C. to 1750° C. or higher.

EXAMPLES

The invention is illustrated by the following Examples:

EXAMPLE I

A total of 2577 g of Bird-River chromite concentrate (26.9% Cr, 22.4% Fe, 15.4% $Al_2O_3$, 8.6% MgO, 2.95% $SiO_2$, 0.67% CaO) sized −100 mesh were blended with 709 g metallurgical coke (90.03% F.C., 8.12% ash 1.61% volatiles, 0.65% S) also sized to −100 mesh. The amount of carbon present in the mixture is equivalent to approximately 125% of the stoichiometric carbon to reduce and carburize all of the contained chromium and iron oxides. This mixture was agglomerated with 2% bentonite and 10% water into 1 in. diameter cylindrical briquets employing a hydraulic press at 12,000 lb. load. The briquets were dried at 100° C. and charged to a high-temperature Astro-furnace (12.5 KW) employing a graphite crucible and flowing CO as protective atmosphere. The heating schedule comprised 2 hrs. to reach 1600° C., 2 hrs. at 1600° C., followed by cooling in furnace under CO gas. Final weight was 2186 g.

A total of 1725 g of the reduced and carburized concentrate (approximately 65% metallics −35% gangue) was ground to −100 mesh and atrititioned in a 1-liter Wemco cell for 10 minutes at 2000 rpm and 80% solids in the water slurry. The scrubbed material was elutriated in a rising flow of water at 15.2 cm/minute for 25 minutes to remove gangue constituents with the overflow and 1277 g of #1 concentrate were recovered which contained approximately 20% residual gangue.

Following grinding of #1 concentrate to −150 mesh attritioning and elutriation at similar conditions were repeated on 1235 g of material. The overflow from this separation step was passed through a Sala wet magnetic separator to recover additional product.

A total of 935 g of gravity concentrate and 35 g of magnetic concentrate were recovered. The gravity contained approximately 91% metallics, balance magnesium aluminate. Total chromium recovery from the chromite into the combined concentrates after 2 attrition-elutriation steps is 79%.

Chemical composition and X-ray data for the #2 concentrate are shown in the following Tables III and IV, and a material balance is shown in the following Table V:

TABLE III

| COMPOSITION OF PRODUCT | | |
|---|---|---|
| % Cr | 42.8 | |
| Fe | 34.8 | |
| Si | 5.5 | metallics 90.9 |
| C | 7.8 | |
| MgO | 4.1[1] | |
| $Al_2O_3$ | 6.6[1] | residual gangue |
| CaO | 1.4 | 12.1 |
| Total | 103.0[2] | |

[1] A portion of these oxides may be present as metallics
[2] The % exceeds 100% owing to experimental errors in the determination

TABLE IV

| X-RAY DIFFRACTION OF PRODUCT |
|---|
| Present: |
| -$Cr_7C_3$ and/or $(Cr,Fe)_7C_3$ |
| -Possibly some FeC |
| -Graphite (free) |
| -Spinel (MgO . $Al_2O_3$) |
| No oxides of chromium and iron |
| No silica, although small amounts may be present. SiC and FeC difficult to detect because of overlay of patterns with other carbides |

TABLE V

MATERIALS BALANCE - DIRECT CARBURIZATION OF BIRD RIVER CONCENTRATE AND GANGUE SEPARATION

| Charge: | Wt. (g) | %Cr. Wt. | Dist. | %Fe Wt. | Dist. | %C Wt. | Dist. | %$Al_2O_3$ Wt. | Dist. | %MgO Wt. | Dist. | %$SiO_2$ Wt. | Dist. | %CaO Wt. | Dist. |
|---|---|---|---|---|---|---|---|---|---|---|---|---|---|---|---|
| Chromite | 2577.0 | 26.9 | 100 | 22.4 | 97.0 | — | — | 15.4 | 94.6 | 8.6 | 99.0 | 2.95 | 57.8 | .67 | 57.5 |
| Coke | 708.7 | — | — | 1.1 | 1.3 | 90 | 100 | 1.6 | 2.7 | — | — | 3.20 | 17.3 | 1.60 | 37.5 |
| Bentonite | 65.7 | — | — | 1.4 | 1.7 | — | — | 17.2 | 2.7 | 3.4 | 1.0 | 49.9 | 24.9 | 2.3 | 5.0 |
| Total | 3351.4 | 20.7 | 100 | 17.8 | 100.0 | 19.0 | — | 12.5 | 100.0 | 6.7 | 100.0 | 3.9 | 100.0 | .9 | 100.0 |
| Carburized Product | 2185.6 | 31.4 | 99.0 | 22.6 | 83.0 | 8.31 | 28.5 | 16.5 | 86.0 | 8.44 | 82.4 | 7.02* | 116.7 | 1.46 | 106.0 |
| Attrition/Elutriation of Carburized Product | | | | | | | | | | | | | | | |
| Carburized Product | 1725.0 | 31.4 | 99.0 | 22.6 | 83.0 | 8.31 | 28.5 | 16.5 | 86.0 | 8.44 | 82.4 | 7.02* | 116.7 | 1.46 | 106.0 |
| #1 Concentrate | 1277.0 | 36.2 | 84.5 | 32.8 | 89.2 | 7.92 | 20.1 | 11.1 | 42.8 | (5.5) | (40.1) | (7.9) | (96.8) | — | — |
| #1 Tails | 448.0 | 14.8 | 12.1 | 11.9 | 11.3 | 8.84 | 7.9 | 27.9 | 37.8 | 16.7 | 42.3 | 4.60 | 19.9 | — | — |
| Attrition/Elutriation of #1 Concentrate | | | | | | | | | | | | | | | |
| #1 Concentrate | 1235.0 | 36.2 | 84.5 | 32.8 | 89.2 | 7.92 | 20.1 | 11.1 | 42.8 | (5.5) | (40.1) | (7.9)* | (96.8) | — | — |
| #Conco (gravity) | 935.0 | 42.8 | 75.6 | 34.8 | 71.6 | 7.82 | 15.0 | 6.6 | 19.3 | 4.1 | 22.6 | 8.3* | 77.0 | — | — |
| #3 Conc. (Mags) | 35.0 | 40.1 | 2.7 | 31.6 | 2.4 | 8.34 | .6 | 9.2 | 1.0 | — | — | — | — | — | — |

TABLE V-continued

MATERIALS BALANCE - DIRECT CARBURIZATION OF BIRD RIVER CONCENTRATE AND GANGUE SEPARATION

| Charge: | Wt. (g) | %Cr. Wt. | %Cr. Dist. | %Fe Wt. | %Fe Dist. | %C Wt. | %C Dist. | %Al₂O₃ Wt. | %Al₂O₃ Dist. | %MgO Wt. | %MgO Dist. | %SiO₂ Wt. | %SiO₂ Dist. | %CaO Wt. | %CaO Dist. |
|---|---|---|---|---|---|---|---|---|---|---|---|---|---|---|---|
| #3 Tails (non-Mags) | 265.0 | 17.1 | 8.6 | 13.7 | 8.0 | 10.1 | 5.5 | 36.3 | 30.0 | 17.9 | 28.0 | 6.0 | 15.8 | — | — |

Figures in brackets are calculated
*Silica is present primarily as SiC

EXAMPLE II

An ore containing 49.3% Mn, 2.8% Fe, 5.9% $SiO_2$ and 3.52% $Al_2O_3$ was ground to 97% −200 mesh and was mixed with finely ground (100% −150 mesh) graphite containing 70% fixed carbon in a quantity of about 100% excess of the quantity necessary to form $Mn_7C_3$ and $Fe_3C$ from the manganese and iron values of the ore.

The ore, carbon and a small amount of binder were thoroughly mixed and pressed to form compacts sized about 1" diameter and about 1" long. Samples of compacts were fired at different temperatures under a reduced pressure for different time periods. The conditions are reproduced in the following Table VI:

TABLE VI

| Test No. | Reduced Pressure mm. Hg. | Heating Time (hrs.) | Temperature (average) |
|---|---|---|---|
| 1 | 0.8 | 1 | 2228° F. (1220° C.) |
| 2 | 0.8 | 2 | 2379° F. (1304° C.) |

Following the firing, the products were subjected to elutriation to obtain samples rich in manganese carbide and at high manganese recoveries.

EXAMPLE III

A charge of 100 gms of the same ore as used in Example II (100% −200 mesh), 26.6 gms of CaO (100% −200 mesh) and 28.7 gms of graphite (100% −400 mesh, 95% fixed carbon) was mixed with water and the resultant slurry was thoroughly stirred and partially dried to give a thick paste which was formed into pellets approximately 1¼" in diameter. The pellets were allowed to dry overnight.

Samples of the pellets were heated to a reaction temperature while being subjected to a vacuum and held at the reaction temperature for a certain period of time. The conditions are outlined in the following Table VII:

TABLE VII

| Test No. | Heating up Time (min.) | Heating Time (min.) | Max, Temp. °C. | Lowest Pressure attained |
|---|---|---|---|---|
| 1 | 85 | 4 | 1343 | 3 × 10⁻³ mm Hg. |
| 2 | 76 | 120 | 1371 | 46 cm Hg. |

After cooling, the product was subjected to a heavy liquid separation using Clerici solution and the fractions analyzed for Mn, Fe and C contents. The results are reproduced in the following Table VIII:

TABLE VIII

| Test No. | Wt. % | Wt. gm. | Fe Wt. % | Fe Wt. gm. | C Wt. % | C Wt. gm. | Mn Wt. % | Mn Wt. gm. | Distribution % |
|---|---|---|---|---|---|---|---|---|---|
| 1 Product | 100 | 19 | | | | | | | |
| Sink | 49.47 | 9.4 | 2.12 | 0.20 | 6.68 | 0.62 | 77.8 | 7.31 | 77.7 |
| Float | 50.53 | 9.6 | 1.85 | 0.17 | 11.70 | 1.12 | 21.9 | 2.10 | 22.3 |
| 2 Product | 100 | 10 | | | | | | | |
| Sink | 72.0 | 7.2 | 4.50 | 0.324 | 6.54 | 0.47 | 85.80 | 6.17 | 82.6 |
| Float | 28.0 | 2.8 | 3.14 | 0.087 | 18.00 | 0.50 | 46.6 | 1.3 | 17.4 |

EXAMPLE IV

The physical properties of various metals, carbides and metal oxides of metals desired to be separated in accordance with this invention and those of typical gangue materials are outlined in the following Table IX:

TABLE IX

Specific Gravity Values (g/cm³)

| Element | Metal | Carbide | Metal Oxide | Typical Gangue Constituents in Ores |
|---|---|---|---|---|
| Chromium | Cr - 7.20 | $Cr_3C_2$ - 6.68 | $Cr_2O_3$ - 5.21<br>$FeO \cdot Cr_2O_3$ - 4.97 | $SiO_2$ - 2.19-2.32<br>$CaO \cdot SiO_2$ - 2.50<br>$2CaO \cdot SiO_2$ - 2.97-3.28 |
| Manganese | Mn - 7.20 | $Mn_3C$ - 6.89 | $Mn_3O_4$ - 4.86<br>$MnO \cdot SiO_2$ - 3.72 | CaO - 2.92<br>$CaO \cdot Al_2O_3 \cdot 2SiO_2$ - 2.77<br>$3CaO \cdot Al_2O_3$ - 3.04 |
| Iron | Fe - 7.86 | $Fe_3C$ - 7.69 | $Fe_2O_3$ - 5.24<br>$Fe_3O_4$ - 5.18 | $MgO \cdot SiO_2$ - 3.19<br>$2MgO \cdot SiO_2$ - 3.21<br>MgO - 3.58 |
| Vanadium | V - 5.96 | VC - 5.77 | $V_2O_5$ - 3.36 | $MgO \cdot Al_2O_3$ - 3.60 |
| Tungsten | W - 19.35 | WC - 15.63<br>$W_2C$ - 17.15 | $WO_3$ - 7.16 | |
| Molybdenum | Mo - 10.2 | MoC - 8.2<br>$Mo_2C$ - 8.9 | $MoO_2$ - 6.47 | |
| Columbium | Cb - 8.57 | CbC - 7.6 | $Cb_2O_5$ - 4.47 | |

It will be seen from the above Table IV that metals and their carbides have densities ranging from 5.77 to 19.35 while the densities of gangue constituents vary from 2.19 to 3.60. Based on an average density value of 2.9 for gangue, the carbides of chromium, manganese and iron are at least twice as heavy, so that simple physical separation, e.g. by gravity employing water elutriation will yield high carbide recoveries (85 to 95%).

SUMMARY

The present invention, therefore, provides a process for the recovery of metal values from ores by direct carburization of the metal oxide values of the ore and subsequent simple physical separation of a substantially pure metal carbide product. Modifications are possible within the scope of the invention.

What I claim is:

1. A method for the formation in substantially pure solid form of a metal carbide of a metal selected from the group consisting of titanium, zirconium, hafnium, vanadium, niobium, tantalum, chromium, molybdenum, uranium, tungsten, manganese, iron and mixtures thereof, which comprises:

forming a blend of finely divided carbon and a finely divided ore or concentrate thereof, said ore or concentrate thereof containing said metal in oxide, carbonate and/or hydroxide form and gangue constituents comprising at least one oxide selected from the group consisting of silica, alumina, magnesia and lime, said carbon being present in said blend in an amount at least sufficient to convert all said metal in oxide, carbonate and/or hydroxide form in said ore or concentrate thereof to a corresponding metal carbide, heating said blend in a reaction zone to a temperature at least sufficient to initiate and sustain a single step solid state reducing and carburization reaction between said carbon and said metal in oxide, carbonate and/or hydroxide form to convert substantially all said metal in oxide, carbonate and/or hydroxide form to a corresponding solid metal carbide in accordance with the schematic equation:

$$MeO + 2C \rightarrow MeC + CO$$

wherein MeO is the metal in oxide, carbonate and/or hydroxide form and MeC is the metal carbide, while removing carbon monoxide evolved in said solid state reaction from said reaction zone, the temperature of said heating in said solid state reaction being insufficiently high to result in significant reduction of said gangue constituents, whereby said gangue constituents are left substantially unaffected by said solid state reaction, and, after completion of said solid state reaction, physically separating said solid metal carbide in substantially pure form from said unaffected solid gangue constituents.

2. The method of claim 1 wherein said heating temperature is below about 1500° C.

3. The method of claim 1 wherein said solid state reaction is effected at a temperature such that the carbon monoxide evolved exerts a partial pressure less than atmospheric and said evolved carbon monoxide is removed by flushing the same from said reaction vessel.

4. The method of claim 1 wherein said solid state reaction is effected at a temperature such that the carbon monoxide evolved exerts a partial pressure greater than atmospheric and said evolved carbon monoxide is removed by venting the same from said reaction vessel.

5. The method of claim 1, wherein said metal is a mixture of iron and an element selected from chromium and manganese and said solid state reaction is effected to result in a mixture of iron carbide and chromium carbide containing from about 3 to about 8% by weight of carbon in said carbide form.

6. The method of claim 5 including decreasing the carbon content of said mixture to a value of about 0.07 to about 1.5% by weight of carbon in said carbide form.

7. The method of claim 1, 2, 3, 4 or 5 wherein said physical separation is effected by grinding the product resulting from said solid state carburization and subjecting the ground mass to hydroelutriation to settle and separate the heavier metal carbide particles from the lighter gangue particles which are removed in the overflow.

* * * * *